United States Patent [19]

Nagano

[11] Patent Number: 4,574,205
[45] Date of Patent: Mar. 4, 1986

[54] TEMPERATURE DETECTING TRANSISTOR CIRCUIT

[75] Inventor: Katsumi Nagano, Shimonoseki, Japan

[73] Assignee: Tokyo Shibaura Denki Kabushiki Kaisha, Japan

[21] Appl. No.: 505,435

[22] Filed: Jun. 17, 1983

[30] Foreign Application Priority Data

Jun. 18, 1982 [JP] Japan ................... 57-103944

[51] Int. Cl.[4] ............... H01L 31/00; H03K 3/01; H02H 5/04
[52] U.S. Cl. .................... 307/310; 307/255; 307/297; 361/103; 357/28
[58] Field of Search ........... 307/310, 297, 255; 323/1; 361/99, 101, 102, 103; 357/28

[56] References Cited

U.S. PATENT DOCUMENTS

| 4,123,698 | 10/1978 | Timko et al. | 323/1 |
| 4,204,133 | 5/1980 | Ahmed | 307/310 |
| 4,287,439 | 9/1981 | Leuscher | 307/310 |

OTHER PUBLICATIONS

Analog Integrated Circuit Design, A. B. Grebene, pp. 205-209, 1972.

Primary Examiner—Stanley D. Miller
Assistant Examiner—B. P. Davis
Attorney, Agent, or Firm—Finnegan, Henderson, Farabow, Garrett & Dunner

[57] ABSTRACT

A temperature detecting transistor circuit includes a first transistor which is connected at the collector to a power source and at the emitter to a ground terminal via first and second resistors, and a second transistor which is connected at the collector to the power source and at the emitter to ground through a third resistor. Further included are a current source which is connected between the power source and the base electrodes of the first and second transistors, and a third transistor which is connected at the base electrode to a node connecting the first and second resistors, at the emitter to the base electrodes of the first and second transistors, and at the collector to the ground terminal. A voltage proportional to absolute temperature is derived from the emitter of the second transistor.

6 Claims, 10 Drawing Figures

TEMPERATURE DETECTING TRANSISTOR CIRCUIT

BACKGROUND OF THE INVENTION

The present invention relates to a temperature detecting transistor circuit utilizing a temperature characteristic of transistors.

Using a thermal breaker circuit to forcibly turn off an output transistor acting as a heat source when the temperature of the substrate of a semiconductor integrated circuit (IC) rises above a predetermined value in order to prevent the IC from being thermally damaged, is well known. A prior art thermal breaker circuit utilizes the temperature characteristic of a transistor breaker as shown in FIG. 1. In FIG. 1, a series circuit is shown including a constant current source 1 and a Zener diode 2 connected with a backward-bias between a power source terminal $V_{cc}$ and a ground terminal G. Another series circuit including resistors 3 and 4 is connected across the Zener diode 2. A transistor 5 for temperature detection is connected at the base electrode to a node B connecting the resistors 3 and 4, at the emitter to the ground terminal G, and at the collector to an output terminal OUT.

In FIG. 1, assuming that a voltage across the Zener diode 2 is $V_Z$, resistances of the resistors 3 and 4 are $R_3$ and $R_4$, respectively, and a voltage across the resistor 4 is $V_4$, the following equation (1) holds $$V_4 = \frac{R_4}{R_3 + R_4} \cdot V_Z \qquad (1)$$

When the voltage $V_4$ exceeds a base-emitter voltage $V_{BE5}$ of the transistor 5, a collector current (or output current) $I_{OUT}$ flows through the collector of the transistor 5.

In FIG. 2, where the abscissa indicates an absolute temperature T°C. and the ordinate the voltages $V_{BE5}$ and $V_4$, a rectilinear line a indicates a temperature characteristic of an ordinary transistor (a change of the base-emitter voltage $V_{BE5}$ in relation to temperature T°C.). Another rectilinear line b is representative of a temperature characteristic of the Zener diode 2 (a change of the voltage $V_4$ in relation to temperature T°C.). As seen from this graph, the Zener diode 2 has a positive temperature coefficient (See the line b), while the base-emitter voltage $V_{BE5}$ of the transistor 5 has a negative temperature coefficient (See the line a). Further, this graph indicates that, when temperature exceeds a temperature point $T_0$, the transistor 5 turns on to allow the collector current $I_{OUT}$ to flow. If an output transistor (not shown) acting as a heat source is connected to the output terminal OUT, the output transistor can be cut off by the use of the output current $I_{OUT}$. Thus, the thermal breaker circuit can protect the IC from being thermally damaged.

To operate the circuit shown in FIG. 1, a voltage $V_{cc}$ applied to the power source terminal $V_{cc}$ is required to be higher than the Zener voltage $V_z$ (about 6 V) of the Zener diode 2. However, this requirement is undesirable in IC's, because the power source voltage Vcc for the IC should be decreased in order to decrease the power consumption. Further, the temperature coefficient of the Zener voltage $V_z$ is only 0.07%/°C., so that the temperature sensitivity of the overall temperature detecting circuit is low.

SUMMARY OF THE INVENTION

Accordingly, an object of the present invention is to provide a temperature detecting transistor circuit operable at a lower power source voltage than the prior art device and with high temperature sensitivity.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the temperature detecting transistor circuit of this invention comprises: first and second transistors of a first conductivity type, the base electrodes of which are connected to each other; means for connecting the collectors of the first and second transistors to a first power source terminal; first and second resistors connected in series means for connecting the emitter of the first transistor to a second power source terminal through said first and second resistors connected in series a third resistor; means for connecting the emitter of the second transistor to the second power source terminal through said third resistor; a current source connected between a node connecting the base electrodes of the first and second transistors and the first power source terminal; a third transistor of a second conductivity type which is connected at the emitter to the node connecting the base electrodes of the first and second transistors, at the collector to the second power source terminal, and at the base electrode to a node connecting the first and second resistors; and a fourth transistor which is connected at the base electrode to the emitter of said second transistor, at the emitter to said second power source terminal, and at the collector to an output terminal producing an output current responding to temperature.

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Figure 3:
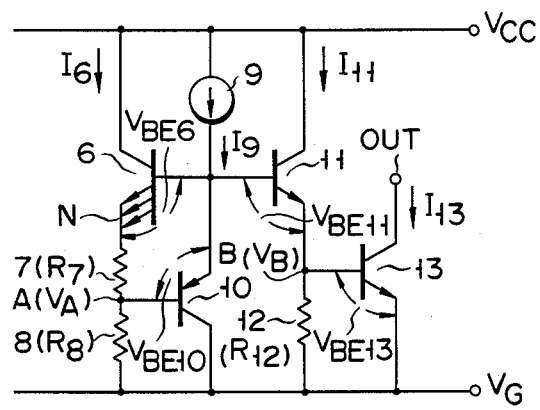
FIG. 3 shows a connection diagram of a first embodiment of a temperature detecting transistor circuit according to the present invention.

Referring to FIG. 3, two npn transistors 6 and 11 are commonly connected at the base electrodes and at the collectors to the power source terminal $V_{cc}$ supplied with a power source voltage $V_{cc}$. The emitter of the transistor 6 is connected to a second power source terminal, i.e., a ground terminal G, through a series circuit of resistors 7 and 8. The emitter of the transistor 11 is connected to the ground terminal G through a resistor 12. A current source 9 is connected between a node connecting the base electrodes of the transistors 6 and 11 and the power source terminal $V_{cc}$. The base electrode of a pnp transistor 10 is connected to a node A connecting the resistors 7 and 8, at the emitter to the node connecting the base electrodes of the transistors 6 and 11, and at the collector to the ground terminal G. A transistor 13 is connected at the base electrode to a node B connecting the emitter of the transistors 11 and the resistor 12, at the emitter to the ground terminal G and at the collector to the output terminal OUT of the transistor 13.

It is assumed that, in FIG. 3, a common emitter current amplification factor $\beta$ of each of the transistors 6, 10 and 11 is sufficiently large. On this assumption, a current equal to the collector current $I_6$ of the transistor 6 flows through the resistors 7 and 8. A current equal to the collector current $I_{11}$ of the transistor 11 flows through the resistor 12. Further, the sum of a base-emitter voltage $V_{BE6}$ of the transistor 6 and a voltage drop across the resistor 7 is applied across the base-emitter path of the transistor 10. Then, the following relation holds, $$V_{BE10} = V_{BE6} + R_7 \cdot I_6 \tag{2}$$

where $V_{BE10}$ is a base-emitter voltage of the transistor 10 and $R_7$ is resistance of the resistor 7. Since a voltage $V_B$ at the node B connecting the emitter of the transistor 11 and the resistor 12 is low, when the transistor 10 is in an OFF state, a relationship between the voltage $V_A$ at the node A and the voltage $V_B$ is given by $$V_B = V_A + V_{BE10} - V_{BE11} \tag{3}$$

where $V_{BE11}$ is a base-emitter voltage of the transistor 11. If $V_{BE10} = V_{BE11}$, rearranging the equations (3), $$V_A = V_B \tag{4}$$

Since the voltages $V_A$ and $V_B$ are equal to the voltage drop across each of the resistors 8 and 12, equations (5) and (6) are established.

$$V_A = I_6 \cdot R_8 \tag{5}$$

$$V_B = I_{11} \cdot R_{12} \tag{6}$$

where $R_8$ and $R_{12}$ are resistances of resistors 8 and 12. Accordingly, if $R_8 = R_{12}$, the following equation (7) holds $$I_6 = I_{11} \tag{7}$$

A base-emitter voltage $V_{BE}$ of a transistor, when it is in an active state, is given by an equation (8)

$$V_{BE} = \frac{kT}{q} \cdot \ln \frac{I_c}{A \cdot I_s} \tag{8}$$

where q is a charge quantity of one electron, k is Boltzmann constant, T the absolute temperature, A an emitter area, and $I_s$ is a saturation current. Accordingly, rearranging the equation (8) and (2), an equation (9) is obtained.

$$V_{BE10} = \frac{kT}{q} \cdot \ln \frac{I_6}{A_6 \cdot I_s} + R_7 \cdot I_6 \tag{9}$$

where $A_6$ is an emitter area of the transistor 6. From the equation (8), $$V_{BE11} = \frac{kT}{q} \cdot \ln \frac{I_{11}}{A_{11} \cdot I_s}$$

is obtained, where $A_{11}$ = an emitter area of the transistor 11. Further, since $V_{BE10} = V_{BE11}$, an equation (10) is obtained from the equation (9), $$\frac{kT}{q} \cdot \ln \frac{I_{11}}{A_{11} \cdot I_s} = \frac{kT}{q} \cdot \ln \frac{I_6}{A_6 \cdot I_s} + R_7 \cdot I_6 \tag{10}$$

Substituting the equation (10) into the equation (7), $$I_6 = I_{11} = \frac{V_T}{R_7} \cdot \ln \frac{A_6}{A_{11}} \tag{11}$$

where $V_T$ is a thermal voltage kT/q. Accordingly, the equation (11) can be written into an equation (12).

$$I_6 = I_{11} = \frac{V_T}{R_7} \cdot \ln N \tag{12}$$

where N is a ratio of the emitter area $A_6$ of the transistor 6 to the emitter area $A_{11}$ of the transistor 11. From the relationships $V_A = I_6 \cdot R_8$, $V_B = I_{11} \cdot R_{12}$, and $V_A = V_B$, an equation (13) ensues $$V_A = V_B = \frac{R_{12}}{R_7} \cdot V_T \cdot \ln N \tag{13}$$

$$= \frac{R_8}{R_7} \cdot V_T \cdot \ln N$$

Figure 1:
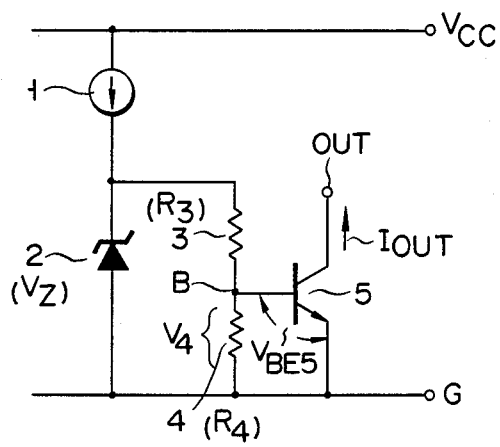
FIG. 1 shows a connection diagram of a conventional temperature detecting transistor circuit.
Figure 2:
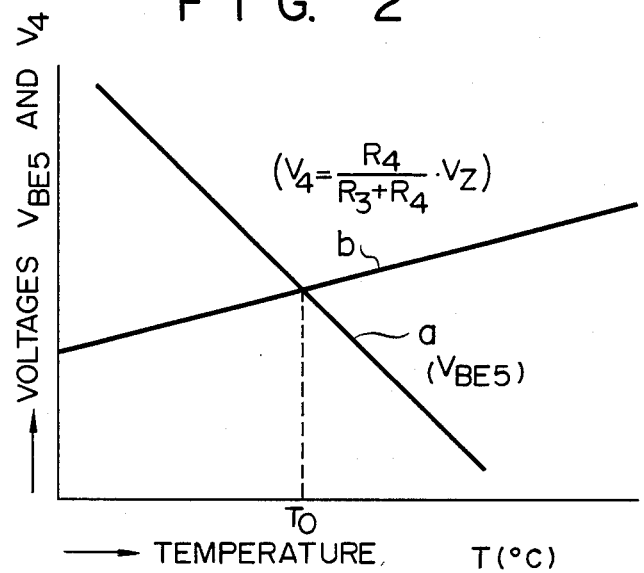
FIG. 2 is a graph illustrating characteristic lines useful in explaining the operation of the FIG. 1 circuit.

As seen from the above, the voltage $V_B$ which is proportional to the absolute temperature T°C. is obtained from the emitter of the transistor 11. The power source voltage $V_{cc}$ necessary for obtaining the voltage $V_B$ in the equation (13) is more than the sum of a voltage drop accross the resistor 12 and the base-emitter voltage $V_{BE11}$, i.e., 1.2 V. Thus, the temperature detecting transistor circuit of this invention can be operated with a lower power source voltage $V_{cc}$ than that of the FIG. 1 circuit. A temperature coefficient $\partial V_B / \partial T$ of the voltage $V_B$ is expressed in the vicinity of normal temperature (T = 300° K.) by an equation (14), $$\frac{\partial V_B}{\partial T} = \frac{T+1}{T} = 1.0033 \tag{14}$$

This indicates that a change of $V_B$ with respect to temperature is +0.33%/°C. which is extremely high compared with +0.07%/°C. of the prior art.

Figure 4:
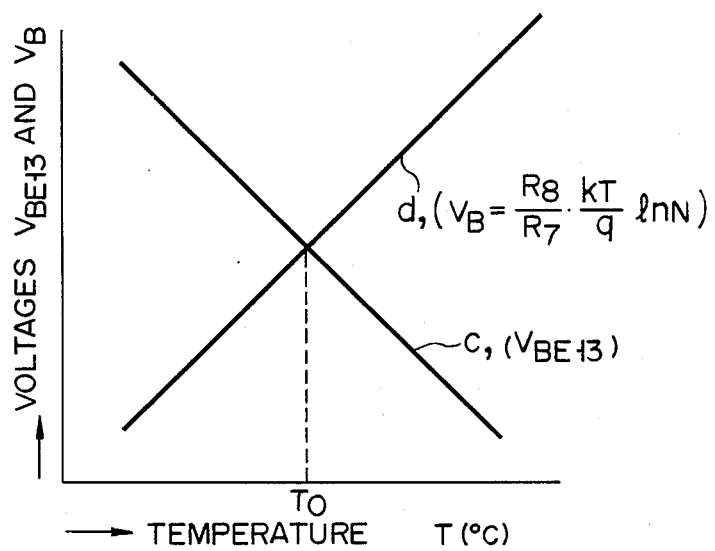
FIG. 4 is a graph illustrating characteristic lines useful in explaining the operation of the FIG. 3 circuit.

Turning now to FIG. 4, a graph is illustrated depicting temperature characteristic lines c and d. In the graph, the abscissa represents temperature T°C. and the ordinate the voltage $V_B$ and the base-emitter voltage $V_{BE13}$. The line c and d indicate $V_{BE13}$ and $V_B$, respectively. The transistor 13 turns on at a temperature range higher than the temperature To°C. In the temperature range, the voltage $V_B$ is higher than the voltage $V_{BE13}$. A collector current $I_{13}$ produced corresponding to the temperature flows through the transistor 13.

Figure 5:
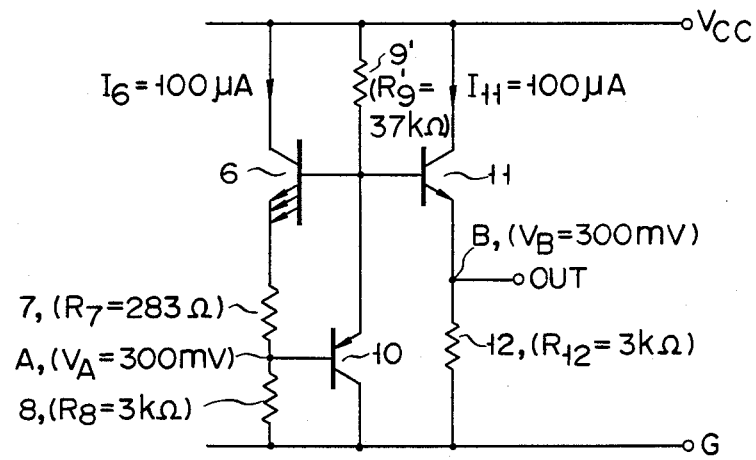
FIG. 5 shows a circuit constructed diagram useful in explaining an experimental example of the present invention.

The operation of the temperature detecting transistor circuit shown in FIG. 3 will be described referring to an experimental circuit shown in FIG. 5 equivalent to FIG. 3 and FIGS. 6 and 7. In FIG. 5, reference numeral 9' designates a resistor equivalent to the current source 9 in FIG. 3. The ratio of the emitter area of the transistor 6 to that of the transistor 11 is set at 3, and the collector currents $I_6$ and $I_{11}$ are selected to be 100 μA respectively. The resistance $R_7$ of the resistor 7 is set at 283 ohms, from the equation (11). The voltages $V_A$ and $V_B$ are set at 300 mV respectively. To this end, the resistances $R_8$ and $R_{12}$ of the resistors 8 and 12 are set at 3 kilo ohms by using the equations (5) and (6). The resistance $R_9'$ of the current source resistor 9' is selected to be 37 kilo ohms.

Figure 6:
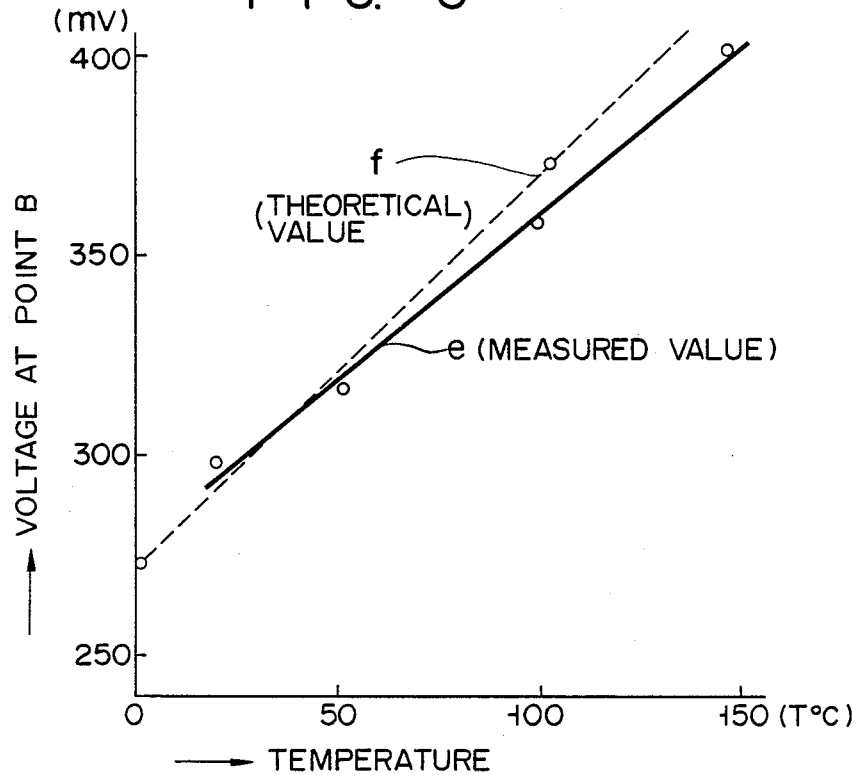
FIG. 6 shows a graph for comparatively illustrating data collected from the FIG. 5 circuit and theoretical values.

FIG. 6 illustrates a change of voltage $V_B$ at point B in the circuit of FIG. 5 in relation to temperature. In the graph, the abscissa represents temperature T°C. and the ordinate a voltage $V_B$ (=OUT) at the point B. In the graph, the measured values are represented by a line e and the corresponding theoretical values are represented by a dotted line f. As can be seen from the results of the experiment, a deviation between a measured value and a theoretical value with respect to the theoretical value at 145° C. is −4.2% and this indicates that a temperature follow-up characteristic of the voltage $V_B$ at the point B is extremely good.

Figure 7:
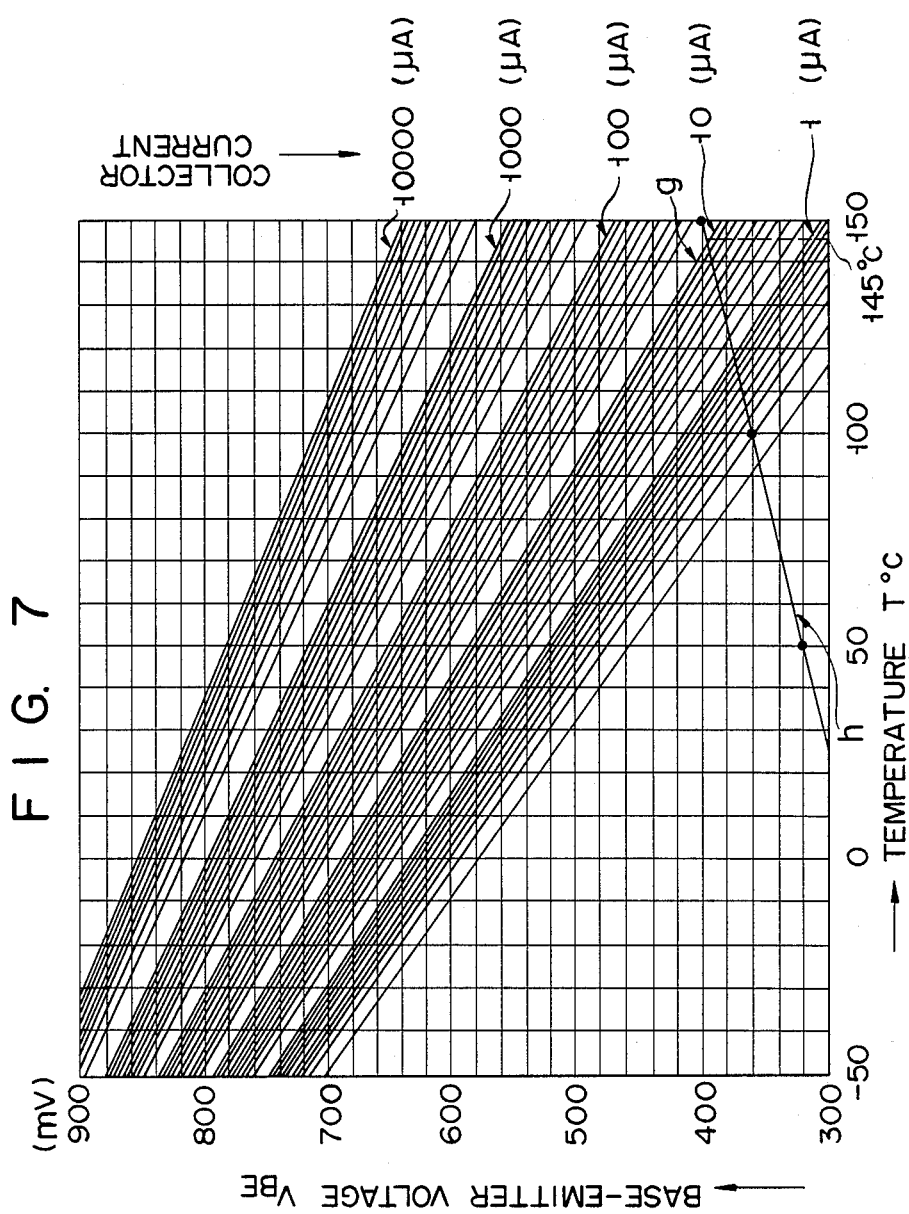
FIG. 7 shows the relationship of temperature T°C. of the transistor to the base-emitter voltage $V_{BE}$, with the collector current as a parameter.

In FIG. 7, a characteristic line h obtained by connecting the measured values of the voltage $V_B$ of the experimental circuit of FIG. 5 is superposed on the temperature characteristic diagram of a transistor. In the temperature characteristic diagram, temperature T°C. of a transistor is plotted along the abscissa and the base-emitter voltage $V_{BE}$ of the transistor along the ordinate, and the collector current (μA) of the transistor is plotted as a parameter. Assume now that when the transistor 13 shown in FIG. 3 is driven by the output voltage $V_B$ at the point B in the circuit of FIG. 5, the collector current $I_{13}$ of the transistor 13 is selected so as to have 10 μA. This means that the collector current of the transistor 13 corresponds to line g in FIG. 7. Under this condition, when temperature T exceeds 145° C. (as indicated by a dotted line in FIG. 7), the transistor 13 (in FIG. 3) is in an active state. If a heat source (not shown), e.g., an output transistor, is cut off using the output current $I_{13}$, a thermal breaker circuit operable at 145° C. is formed.

Figure 8:
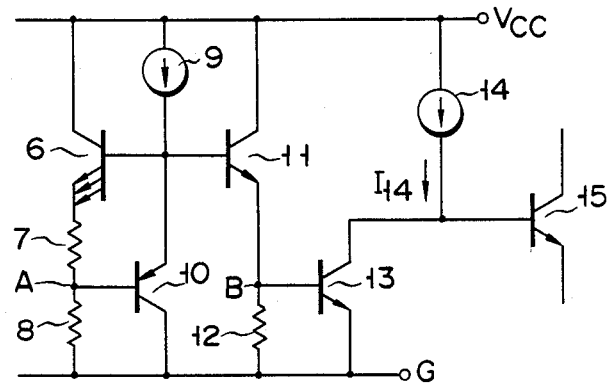
FIG. 8 shows a circuit diagram of a second embodiment of the invention.

FIG. 8 shows a circuit diagram of an embodiment of a thermal breaker circuit as mentioned above. In the figure, like symbols are used for designating like or equivalent portions in FIG. 3. As shown, a current source 14 is connected between the collector of the transistor 13 and the power source therminal $V_{cc}$. The collector of the transistor 13 is connected to the base electrode of the output transistor 15 which is a heat generating source. At a temperature of 145° C. or less, the transistor 15 is driven by the output current $I_{14}$ of the current source 14 and is in an ON state. However, when the temperature of the IC chip exceeds the set temperature 145° C., the transistor 13 is turned on and the transistor 13 pulls the output current $I_{14}$ of the current source 14, so that the output transistor 15 is cut off. The result is to stop the rise of temperature of the IC chip.

Figure 9:
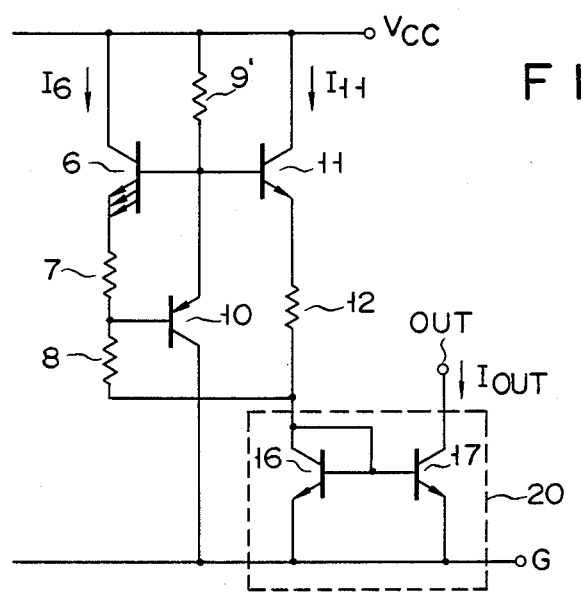
FIG. 9 shows a circuit diagram of a third embodiment of the invention.

FIG. 9 shows a circuit diagram of a third embodiment of the present invention, which comprises a temperature detecting circuit and produces an output current $I_{OUT}$ proportional to an absolute temperature. In the figure, like symbols are used for designating like or equivalent portions in FIG. 3 and only different portions will be explained. In this embodiment, a resistor 9' is connected between the power source terminal $V_{cc}$ and a node connecting the base electrodes of the transistors 6 and 11. The transistor 16 is connected at the collector to a node connecting the resistors 8 and 12 and to the base electrode thereof, and at the emitter to the ground terminal G. The base electrode of the transistor 16 is also connected to the base electrode of the transistor 17. The emitter of the transistor 17 is connected to the ground terminal G and its collector is connected to the output terminal OUT. The collector of the transistor 10 is connected to the ground terminal G. The transistors 16 and 17 cooperate to form a current mirror circuit 20.

In FIG. 9, the output current $I_{OUT}$ of the transistor 17 is equal to the sum of the collector currents $I_6$ and $I_{11}$ of the transistors 6 and 11, and hence the following equation (15) holds $$I_{OUT} = I_6 + I_{11} \tag{15}$$

Therefore, from the equation (12), equation (16), is obtained.

$$I_{OUT} = 2 \cdot \frac{V_T}{R_7} \cdot \ln N \tag{16}$$

Since $V_T = k/q \cdot T$, the $I_{OUT}$ in the equation (16) is proportional to the absolute temperature T.

Figure 10:
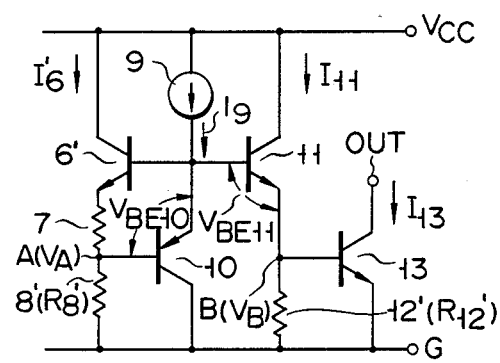
FIG. 10 shows a circuit diagram of a fourth embodiment of the invention.

In the first to third embodiments shown in FIGS. 3, 8 and 9, the ratio of emitter area of the transistor 6 to that of transistor 11 is set to be N. However, the ratio can be set at 1. In FIG. 10, the ratio between the emitter areas of transistors 6' and 11 is set at 1. In this instance, the resistors 8 and 12 in FIG. 3 are denoted as 8' and 12', respectively. If the emitter grounded current amplifier factor of each of the transistors 6', 10 and 11 is sufficiently large, the base-emitter voltage $V_{BE10}$ of the transistor 10, as in the equation (9), is $$V_{BE10} = \frac{kT}{q} \cdot \ln \frac{I_6'}{A_6' \cdot I_s} + R_7 \cdot I_6' \tag{17}$$

where $I_6'$ is a collector current of the transistor 6', and $A_6'$ is an emitter area of the transistor 6'. If this voltage $V_{BE10}$ is equal to the base-emitter voltage $V_{BE11}$ of the transistor 11, then $$\frac{kT}{q} \cdot \ln \frac{I_{11}}{A_{11} \cdot I_s} = \frac{kT}{q} \cdot \ln \frac{I_6'}{A_6' \cdot I_s} + R_7 \cdot I_6' \tag{18}$$

Rearranging the equation (18), $$R_7 \cdot I_6' = \frac{kT}{q} \cdot \ln \frac{I_{11}}{A_{11}} \cdot \frac{A_6'}{I_6'} \tag{19}$$

Since $A_{11} = A_6'$, the equation (19) can be rewritten into the following equation (20), $$R_7 \cdot I_6' = \frac{kT}{q} \cdot \ln \frac{I_{11}}{I_6'} \tag{20}$$

Here, it is assumed that $$I_{11} = N \cdot I_6' \tag{21}$$

Substituting the equation (21) into the equation (20), $$I_6' = \frac{1}{R_7} \cdot \frac{kT}{q} \cdot \ln N \tag{22}$$

$$= \frac{V_T}{R_7} \cdot \ln N$$

The equation (22) corresponds to the equation (12). The voltage $V_A$ at the node A connecting the resistors 7 and 8' is expressed by an equation (23), and the voltage $V_B$ at the emitter of the transistor 11 is expressed by an equation (24).

$$V_A = I_6' \cdot R_8' \tag{23}$$

$$V_B = I_{11} \cdot R_{12}' \tag{24}$$

For obtaining the equation (13), it was assumed that $V_A = V_B$. For satisfying this condition, the following relation must hold $$R_8' = \frac{I_{11}}{I_6'} \cdot R_{12}' \tag{25}$$

$$= N \cdot R_{12}'$$

In other words, when the emitter areas of the transistors 11 and 6' are equal to each other, the resistance $R_8'$ of the resistor 8' must be set to N times the resistance $R_{12}'$ of the resistor 12'. Under this condition, the circuit of this embodiment operates in exactly the same manner as when the emitter area ratio of the transistors 6 and 11 is N. By selecting the resistances $R_8'$ and $R_{12}'$ as mentioned above, the voltage $V_B$ at the node B in FIG. 10 is expressed by the following equation (26).

$V_B = R_{12}' \cdot I_{11} = R_8'/N \cdot I_{11}$, and if $I_{11} = N \cdot I_6'$ equation (21) is substituted into the $V_B$, equation then $V_B = R_8'/N_{kT} \cdot N \cdot I_6'$, and if the equation (22), $I_6' = 1/R_7 \cdot kT/q \cdot \ln N$, is substituted into this $V_B$ equation, the equation (26) results $$V_B = \frac{R_8'}{R_7} \cdot \frac{kT}{q} \cdot \ln N \tag{26}$$

The equation (26) corresponds to the equation (13), and indicates that the voltage $V_B$ is proportional to the absolute temperature T. Also in this embodiment of FIG. 10, the power source voltage $V_{cc}$ may be small and the temperature coefficient of $V_B$ large, as in the embodiment of FIG. 3.

What is claimed is:

1. A temperature detecting transistor circuit comprising:
   first and second transistors of a first conductivity type, the base electrodes of which are connected to each other;
   means for connecting the collectors of said first and second transistors to a first power source terminal;
   first and second resistors connected in series;
   means for connecting the emitter of said first transistor to a second power source terminal through said first and second resistors connected in series;
   a third resistor;
   means for connecting the emitter of said second transistor to said second power source terminal through said third resistor;
   a current source connected between a node connecting the base electrodes of said first and second transistors and said first power source terminal;
   a third transistor of a second conductivity type which is connected at the emitter to said node connecting the base electrodes of said first and second transistors, at the collector to said second power source terminal, and at the base electrode to a node connecting said first and second resistors; and
   a fourth transistor which is connected at the base electrode to the emitter of said second transistor, at the emitter to said second power source terminal, and at the collector to an output terminal producing an output current responsive to temperature.

2. A temperature detecting transistor circuit according to claim 1, wherein the ratio of the emitter area of said first transistor to that of said second transistor is N (N being larger than 1).

3. A temperature detecting transistor circuit according to claim 1, wherein the ratio of the emitter area of said first transistor to that of said second transistor is 1.

4. A temperature detecting transistor circuit according to claim 1, further comprising a second current source and a fifth transistor and wherein the collector of said fourth transistor is connected to said first power source terminal through said second current source and is connected to the base electrode of said fifth transistor operating as an output transistor.

5. A temperature detecting transistor circuit comprising:
   first and second transistors of a first conductivity type, the base electrodes of which are connected to each other;
   means for connecting the collectors of said first and second transistors to a first power source terminal;
   first, second and third resistors;
   a third transistor which is connected at the collector to the base electrode thereof, to the emitter of said first transistor through said first and second resistors connected in series, and to the emitter of said second transistor through said third resistor, and is connected at the emitter to a second power source terminal;
   a fourth transistor which is connected at the base electrode to the base electrode of said third transistor, at the emitter to said second power source terminal, and at the collector to an output terminal thereof;
   a fourth resistor connected between a node connecting the base electrodes of said first and second transistors and said first power source terminal; and
   a fifth transistor of a second conductivity type which is connected at the emitter to said node connecting the base electrodes of said first and second transistors, at the collector to said second power source terminal, and at the base electrode to a node connecting said first and second resistors.

6. A temperature detecting transistor circuit according to claim 5, wherein the ratio of the emitter area of said first transistor to that of said second transistor is N, N being larger than 1.

* * * * *